United States Patent
Malerevich

(10) Patent No.: US 7,599,361 B2
(45) Date of Patent: Oct. 6, 2009

(54) WIRE-SPEED PACKET MANAGEMENT IN A MULTI-PIPELINE NETWORK PROCESSOR

(75) Inventor: Oren Malerevich, Kiryat Uno (IL)

(73) Assignee: P-Cube Ltd., Hertzlia (IL)

( * ) Notice: Subject to any disclaimer, the term of this patent is extended or adjusted under 35 U.S.C. 154(b) by 901 days.

(21) Appl. No.: 10/882,305

(22) Filed: Jul. 2, 2004

(65) Prior Publication Data

US 2006/0002392 A1    Jan. 5, 2006

(51) Int. Cl.
*H04L 12/28* (2006.01)
*G06F 13/00* (2006.01)

(52) U.S. Cl. .................. 370/389; 370/392; 370/419; 711/108

(58) Field of Classification Search .................. None
See application file for complete search history.

(56) References Cited

U.S. PATENT DOCUMENTS

| | | | |
|---|---|---|---|
| 4,788,656 A | 11/1988 | Sternberger | |
| 5,414,704 A | 5/1995 | Spinney | |
| 5,617,421 A | 4/1997 | Chin et al. | |
| 5,673,263 A | 9/1997 | Basso et al. | |
| 5,715,250 A | 2/1998 | Watanabe | |
| 5,806,086 A | 9/1998 | Kimmel et al. | |
| 5,842,040 A | 11/1998 | Hughes et al. | |
| 5,898,837 A | 4/1999 | Guttman et al. | |
| 5,946,302 A | 8/1999 | Waclawsky | |
| 5,956,721 A | 9/1999 | Douceur et al. | |
| 5,995,488 A | 11/1999 | Kalkunte et al. | |
| 5,995,971 A | 11/1999 | Douceur et al. | |
| 6,041,054 A | 3/2000 | Westberg | |
| 6,104,696 A | 8/2000 | Kadambi et al. | |
| 6,185,208 B1 | 2/2001 | Liao | |
| 6,275,861 B1 | 8/2001 | Chaudri et al. | |
| 6,404,752 B1 | 6/2002 | Allen et al. | |
| 6,434,153 B1 | 8/2002 | Yazaki et al. | |
| 6,460,120 B1 | 10/2002 | Bass et al. | |
| 6,502,185 B1 * | 12/2002 | Keller et al. | ................. 712/213 |
| 6,542,508 B1 | 4/2003 | Lin | |
| 6,590,894 B1 | 7/2003 | Kerr et al. | |

(Continued)

OTHER PUBLICATIONS

T.V. Lakshman, et al, High-speed policy-based packet forwarding using efficient multi-dimensional range matching, 1998, ACM SIGCOMM Computer Communication Review, vol. 28, No. 4, pp. 203-214.

(Continued)

*Primary Examiner*—Huy D. Vu
*Assistant Examiner*—Brandon Renner
(74) *Attorney, Agent, or Firm*—Abelman, Frayne & Schwab

(57) ABSTRACT

A flow-identification content addressable memory (FICAM) comprising a row of content addressable memory (CAM) cells operable to store a first flow-identification. The first flow-identification corresponds to a first packet dispatched for processing by a pipeline unit (PU) belonging to a network processor. A comparison unit compares a second flow-identification corresponding to a second packet with contents of said at least a row of CAM cells. The comparison unit is further capable of determining if the second flow-identification is same as the first flow-identification. A flow identification eraser is provided for removing the first flow-identification from said at least a row of CAM cells upon determination by the comparison unit that the second flow-identification is same as the first flow-identification.

20 Claims, 2 Drawing Sheets

U.S. PATENT DOCUMENTS

| | | | |
|---|---|---|---|
| 6,633,920 | B1 | 10/2003 | Bass et al. |
| 6,700,889 | B1 | 3/2004 | Nun |
| 6,792,502 | B1* | 9/2004 | Pandya et al. ............... 711/108 |
| 7,185,172 | B1* | 2/2007 | Mick et al. .................. 711/206 |
| 7,187,687 | B1* | 3/2007 | Davis et al. ................. 370/419 |
| 7,237,058 | B2* | 6/2007 | Srinivasan .................. 711/108 |
| 7,376,950 | B2* | 5/2008 | Wolrich et al. ............. 718/100 |
| 2001/0010069 | A1* | 7/2001 | Hetherington et al. ...... 711/122 |
| 2001/0016899 | A1 | 8/2001 | Nie |
| 2002/0122386 | A1 | 9/2002 | Calvignal et al. |
| 2002/0165947 | A1 | 11/2002 | Akerman et al. |
| 2002/0191543 | A1* | 12/2002 | Buskirk et al. ........... 370/230.1 |
| 2003/0009618 | A1* | 1/2003 | Regev et al. ................ 711/108 |
| 2003/0043848 | A1* | 3/2003 | Sonksen .................... 370/474 |
| 2003/0046488 | A1* | 3/2003 | Rosenbluth et al. ......... 711/108 |
| 2004/0015599 | A1* | 1/2004 | Trinh et al. ................. 709/232 |
| 2004/0109451 | A1* | 6/2004 | Huang et al. ............... 370/392 |
| 2005/0138297 | A1* | 6/2005 | Sodani et al. ............... 711/143 |
| 2005/0195845 | A1* | 9/2005 | Mayhew et al. ............ 370/412 |

OTHER PUBLICATIONS

Rebecca Thomas, et al, A user guide to the UNIX system, 1985, Obsborne McGraw-Hill, p. 151.
http://developer.intel.com/ial/pbnm, Sep. 2001.

* cited by examiner

WIRE-SPEED PACKET MANAGEMENT IN A MULTI-PIPELINE NETWORK PROCESSOR

FIELD

The present disclosure generally teaches techniques related to network processors, and more specifically to the management of packet processing order within network processors.

BACKGROUND

1. References

The following U.S. patents and papers provide useful background information, for which they are incorporated herein by reference in their entirety.

a) Patents

| | | |
|---|---|---|
| 6,700,889 | March 2004 | Ben-Nun |
| 6,633,920 | October 2003 | Bass et al. |
| 6,460,120 | October 2002 | Bass et al. |
| 6,404,752 | June 2002 | Allen et al. | b) Published Patent Applications

| | | |
|---|---|---|
| 20020165947 | November 2002 | Akerman et al. |
| 20020122386 | September 2002 | Calvignac et al. |
| 20010016899 | August 2001 | Nei | c) Other References

"7-Layer Packet Processing: A Performance Analysis", a white paper by EZchip Technologies, July 2000

2. Introduction

Network processors are commonly used in various nodes throughout a network. These processors process packets and determine the type of handling each packet may require. A commonly used network model is a seven-layer communication model. Such a seven-layer model starts with the physical layer (otherwise known as layer one (L1)) and ends with the application layer (otherwise known as layer seven (L7)) and includes all the layers in-between.

In some conventional applications, handling of packets occurred at relatively lower layers of the seven-layer communication model. On the other hand, a more modern approach attempts to handle packets at higher levels of the communication model, including up to the upper layer. This allows for more efficient and effective handling of the packet as it moves through the network. It enables a network to accelerate the transfer of packets belonging to one application containing time-critical data, for example a video conference call, preferentially over the transfer of packets containing non-critical data. In essence, the more sophisticated the capabilities of the network processor and its related firmware, the more efficient and effective is the handling of the packets and routing thereof.

The ability of the network processors to handle packets in a sophisticated manner allows for an effective increase of the network bandwidth. In such a case, utilization of the network an dramatically increase. This is quite important as there is an ever increasing demand for additional bandwidth over the network and avoidance of network congestion. To enable this, packets are classified prior to the processing by the network processor to identify the packet as belonging to a specific process flow. An example of such a classifier is discussed in U.S. patent application Ser. No. 09/541,598 titled "An Apparatus for Wire-Speed Classification and Pre-Processing of Data Packets in a Full Duplex Network" by Ben-Nun et al., assigned to common assignee, and which is hereby incorporated by reference for all that it contains.

It has been noted that, after classification, packets belonging to different process flows may be executed on multiple network processors to increase system performance. In several network applications in related art, network processors have multiple pipelines within a network processor to provide further acceleration within the network processor itself.

While such increased parallel processing of packets by the network processor is of significant importance, there is a limitation that results from the actual design of packet based processing. Specifically, the chronological order among packets arriving at a destination needs to be maintained. However, when massively parallel network processors as well as sub-systems within the network processor attempt to transmit packets at high speed, there is a risk of a later packet moving ahead of an earlier packet. This results in an error message from the destination node. A request to re-transmit packets is often generated, causing an effective reduction of the network bandwidth. Moreover, as network processors become more sophisticated it is possible that a packet will be required to move through multiple independent pipelines of the network processor with or without a predetermined order. Furthermore, the deeper the pipeline of a network processor, the more likely it is that additional latency will be experienced until the processing of a packet is complete, and therefore the tendency to use shallow pipelines, if at all.

Concept of latency is explained further herein using a case of a pipeline having four stages. A packet to be processed moves from one stage to the other, for example on every clock cycle. If a packet belonging to the same process flow cannot enter the pipeline before the first packet completed processing, it will take four clock cycles before the second one can enter. If there are only two stages then that would be two cycles, and for eight stages it would be 8 clock cycles. To perform processing at very high speeds, it is advantageous to provide very deep pipeline. This is because, besides the initialization and the end of the processing, the processing is very fast, assuming there are no contentions. The latency is the time it takes for a packet to complete the motion through the pipeline. In the case where the pipeline has four stages, latency is four cycles. It is compared with the throughput of the pipeline which is one cycle. The idea is to always reduce the throughput to one cycle because this is the fastest. Depending on the task at hand it may be necessary to adjust the depth of the pipeline to achieve that goal.

It would be advantageous to provide techniques to overcome the above-noted problems in the network transmission of packets.

SUMMARY

To overcome some of the problems noted above, the disclosed teachings provide a flow-identification content addressable memory (FICAM) comprising a row of content addressable memory (CAM) cells operable to store a first flow-identification. The first flow-identification corresponds to a first packet dispatched for processing by a pipeline unit (PU) belonging to a network processor. A comparison unit compares a second flow-identification corresponding to a second packet with contents of said at least a row of CAM cells. The comparison unit is further capable of determining if the second flow-identification is same as the first flow-identification.

A flow identification eraser is provided for removing the first flow-identification from said at least a row of CAM cells upon determination by the comparison unit that the second flow-identification is same as the first flow-identification.

In a specific enhancement, a hit message is generated when the comparison unit determines that the second flow-identification is same as the first flow-identification.

In another specific enhancement, the comparison unit is capable of comparing a range of flow-identification values.

More specifically, at least one cell in the at least a row of CAM cells is associated with a corresponding stage of a plurality of stages of said PU.

Even more specifically, upon generating said hit message said FICAM further provides information on a stage among said plurality of stages of said PU to which said hit message corresponds.

Still more specifically, said stage indication is used to reschedule the processing of the second packet.

In another specific enhancement, said FICAM is integrated into an integrated circuit (IC).

More specifically, a number of entries in said FICAM is proportionate to a number of process flows expected to be handled by said network processor simultaneously.

Another aspect of the disclosed teachings is a network processor comprising a packet input queue, each packet in said queue having a unique flow-identification. A first pipeline unit (PU) capable of accepting a received packet from the packet input queue for processing is provided. A flow-identification content addressable memory (FICAM) corresponding to said first PU is provided. The FICAM being further capable of accepting a flow-identification of the received packet. A controller is provided for accepting results of a comparison between a flow-identification of the received packet and contents of said FICAM.

In a specific enhancement, the first PU is capable of transferring the received packet upon completion of processing by the first PU to a second PU of said network processor along with the received packet's flow-identification.

In another specific enhancement, said FICAM further comprises a row of content addressable memory (CAM) cells operable to store a first flow-identification. The first flow-identification corresponds to a first packet dispatched for processing by a pipeline unit (PU) belonging to a network processor. A comparison unit is provided to compare a second flow-identification corresponding to a second packet with contents of said at least a row of CAM cells. The comparison unit is further capable of determining if the second flow-identification is same as the first flow-identification. A flow identification eraser is provided for removing said first flow-identification from said at least a row of CAM cells upon determination by the comparison unit that the second flow-identification is same as the first flow-identification.

In another specific enhancement, said first pipeline is capable of processing at least one of: layer seven pay-per-click, layer three and layer four counting, layer five metering.

In another specific enhancement, said network comprises a plurality of FICAMs, said controller being capable of dispatching a packet upon receiving a miss indication from all of said plurality of FICAMs and rescheduling said packet upon receiving a hit indication from at least one of said plurality of FICAMs.

More specifically, said rescheduling comprises comparing the received packet in a later cycle.

More specifically, said rescheduling comprises repositioning of the received packet to a position where the received packet is most likely to be cleared for execution in a next cycle.

More specifically, said repositioning is based on a stage information provided by a FICAM from among the plurality of FICAMS generating a hit.

In another specific enhancement, wherein a number of entries in the FICAM is proportional to a number of expected flows to be handled by said network processor simultaneously.

Yet another aspect of the disclosed teachings is a method for avoiding packet bypass in a network processor having a flow-identification content addressable memory (FICAM), said method comprising receiving a flow-identification of a packet in an input queue of said network processor. The flow-identification is compared with contents of said FICAM. The packet is rescheduled if a flow-identification matches with one of said contents of said FICAM. The packet is send for processing by a pipeline of said network processor if not match is indicated in the previous step.

In a specific enhancement, the rescheduling comprises repositioning of the received packet to a position where the received packet is most likely to be cleared for execution in a next cycle.

More specifically, the repositioning further comprises at least receiving stage information from the FICAM indicating a match.

In another specific enhancement, the method further comprises updating the FICAM with the flow-identification of said packet.

More specifically, the method further comprises removing said flow-identification of said packet from the FICAM upon completion of processing of the packet by the pipeline.

Even more specifically, the method further comprises updating another pipeline of said network processor with said packet and updating a FICAM respective of said another pipeline with said flow-identification of said packet.

BRIEF DESCRIPTION OF THE DRAWINGS

The disclosed teachings will become more apparent by describing in detail, implementations of the techniques discussed herein with reference to the attached drawings in which.

DETAILED DESCRIPTION

Figure 1:
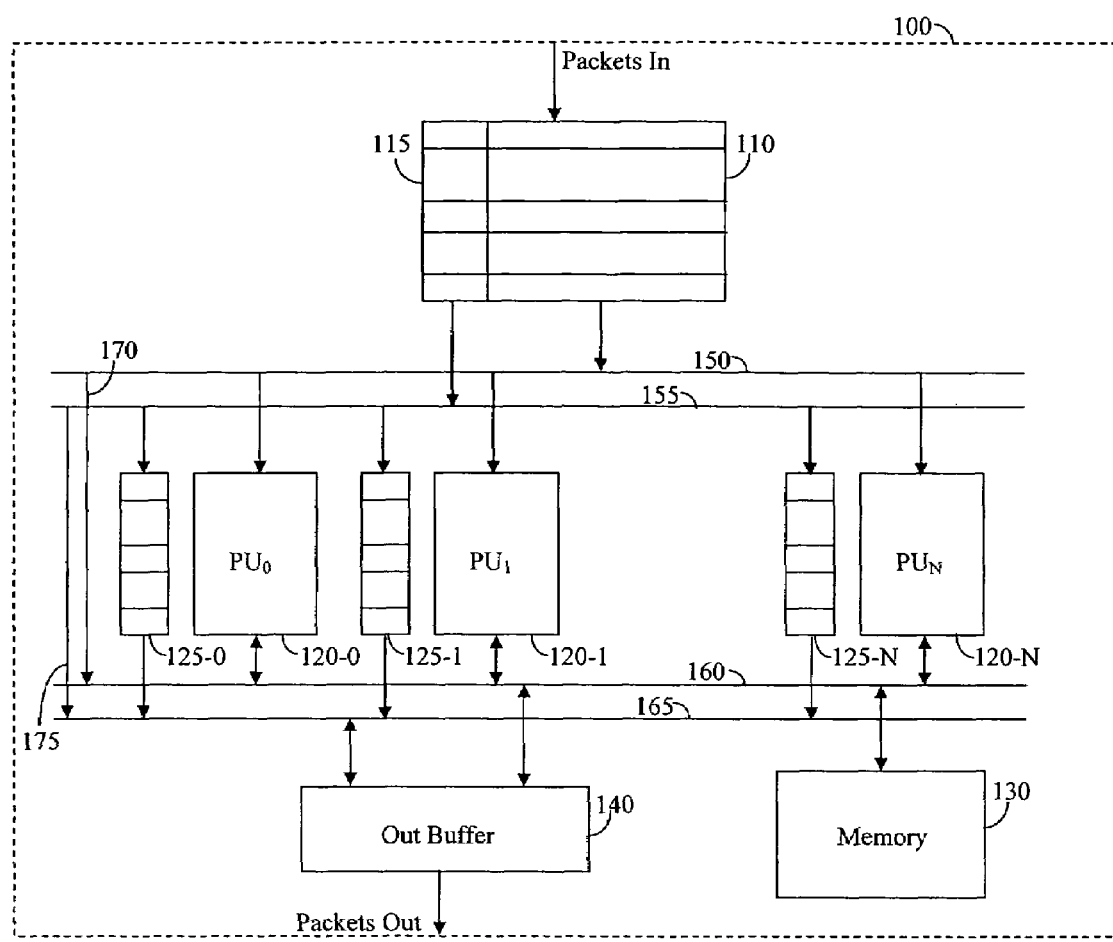
FIG. 1—is an exemplary network processor with flow-id CAMs

Techniques for the wire-speed management of packets flowing over a computer network in a manner that provides for high speed handling of the packets while ensuring that a later packet of a process does not bypass an earlier packet are discussed in detail herein.

The claims alone represent the metes and bounds of the invention. The discussed implementations, embodiments and advantages are merely exemplary and are not to be construed as limiting the present invention. The description of the present invention is intended to be illustrative, and is not intended to limit the scope of the claims. Many alternatives, modifications, and variations will be apparent to those skilled in the art.

Typically, a packet is classified as being part of a process flow to which the packet belongs. For example, packets forming part of a single message (or document) may be classified as being part of a single process flow. Thereafter, the packet is assigned an associated flow-identification (or, flow-id). Packets belonging to the same process flow will have the same flow-identification. In many network systems, it is beneficial for the same network processor to handle all packets belonging to a specific process flow.

A network processor, as noted above, may have a plurality of separate pipeline units (hereinafter "PU", "pipeline unit" or "pipeline"), each capable of handling a task or tasks efficiently. For example, a pipeline may be designated for performing a string search as part of a "layer 7 (L7) string search" application. In this string search, for example a payload is searched for a user name or mail subject. Such a L7 algorithm is typically a collection of instructions executed on a pipeline having the general capabilities of a programmable processor.

Another PU may be allocated for performing layer 3 and layer 4 (L3/L4) counting applications, yet another for layer 5 (L5) metering, and so on. A bypass channel may also be available for such packets not requiring any further processing. In accordance with the disclosed teachings, a flow-identification content addressable memory (FICAM) is attached to each of the plurality of pipelines available to the network processor. Upon dispatching a packet for processing in a specific pipeline, its flow-identification is loaded to the FICAM corresponding to the pipeline. When exiting the pipeline, the flow-identification of the packet is removed using a flow identification remover from the FICAM.

Prior to execution of a packet that is next in the queue ("next packet") by the network processor, the flow identification of the "next packet" is checked against the content of all the FICAMs. The "next packet" will not be allowed to be executed by the network processor as long as the previous packet belonging to the same process flow is still being executed by the network processor, i.e., the ability of the packet to enter the network processor is checked every time the network processor is available to accept a next packet.

In an alternate implementation, the "next packet" will be rescheduled to a position in the queue where it is most likely to be able to receive immediate clearance to execute in a network processor pipeline, however, it will not be allowed to be placed behind a packet belonging to the same process flow so as to avoid out of sequence packets.

Reference is now made to FIG. 1, showing an exemplary and non-limiting network processor 100, modified in accordance with the disclosed teachings. Packets are scheduled for processing in a queue 110. Each packet has a corresponding flow-identification that is in flow-identification queue 115. Network processor 100 further comprises a plurality of pipeline units (PUs) 120-0 through 120-N, each such PU being capable of performing a designated task, or tasks. A person skilled in the art would note that it is possible that two or more PUs will be able to perform identical tasks, allowing for parallel processing of packets belonging to different process flows.

Each PU has an associated FICAM 125-1 through 125-N, respectively. Each FICAM 125-1 through 125-N has a plurality of locations in which a flow-identification of a packet may be positioned upon beginning of execution of the packet in the corresponding PU.

In an alternate implementation, the number of locations in a FICAM corresponds to the number of pipeline stages in its respective PU. A memory 130 is used to hold packet data and an out buffer 140 handles the output of data from network processor 100.

In the network processor 100, a packet reaches an execution point in queue 110, and has a corresponding flow-identification in queue 115. At this time a controller (not shown) of network processor 100 causes the comparison of the flow-identification of that packet to be compared against the content of all FICAMs 125-0 through 125-N. If any one of FICAMs (for example 125-1, responds with a 'hit' message) i.e., indicating that the same flow-identification is present in that FICAM 125-1, then the packet is not dispatched for execution in any one of the plurality of PUs 120. The process of checking for the ability of the packet to begin processing continues periodically, for example every cycle, until such time that a 'miss' message, i.e., an indication that the same flow-identification is not found in any one of FICAMs, is received. Then, the packet is dispatched to an appropriate one of the PUs 120-0 through 120-N and its respective flow-identification loaded into the corresponding FICAM. For example, if a packet is dispatched to PU1 120-1 then the packet's corresponding flow-identification will be placed in FICAM 125-1.

Bypass paths 170 and 175 provide the possibility of bypassing processing by a PU for such cases where a packet does not require any further processing by a PU. However, bypass paths 170 and 175 are used only after verification that no previous packet belonging to the same process flow are at any level of execution in any one of PUs 120.

A person skilled in the art would note that the implementation of path 175 is optional and is to be include as part of a design in such cases where it is necessary to move the packet's flow-identification to a next stage, for example, another network processor. The use of FICAMs allows for the use of deep pipeline network processors and avoids problems of later packets potentially bypassing earlier packets. The provision of FICAMs, thus, helps in preserving the chronological order of packets that form part of a flow.

In an alternate implementation, a FICAM (for example FICAM 125-2) has a number of stages corresponding to the number of stages in the pipeline of a corresponding PU 120-2. Each time execution moves to a next stage of the pipeline of the specific PU 120-2 so is the position of the respective flow-identification of the packet in the FICAM 125-2. Upon detection of a 'hit', i.e., another packet from the same process flow is currently being executed, an indication of the position of the stage in the pipeline of PU 120 where the packet is being executed, allowing the control of queue 110 to reschedule the check packet to a position in the queue where it is more likely to receive an immediate confirmation for execution.

A person skilled in the art would note that it is essential to ensure, in such a case, that the packet is rescheduled in such a manner that it does not go out of sequence, i.e., placed behind a later packet. It should be noted that it is possible that a packet processed on one of the plurality of PUs may require continued execution on another of the plurality of PUs. In such a case the first PU, for example PU 120-0, will update the other PU, for example 120-1, with the packet information, including the update of the respective FICAM, for example FICAM 125-1. The number of entries in FICAM is generally proportionate to the number of process flow that network processor 100 is expected to handle simultaneously. Additional entries can be further included for increasing the error margin.

In yet another alternate implementation, a modified CAM (MCAM), such as the one disclosed by Ben-Nun in U.S. Pat. No. 6,700,889 titled "High Speed Apparatus and Method for Classifying a Data Packet Based on Data Values Contained in the Data Packet", assigned to common assignee and which is herein incorporated by reference for all that it contains, is used to implement a FICAM.

The MCAM can handle a range of flow identifications rather than only a single flow identification value that is presented to it. In the case where a father process flow generates child process flows, a process that may continue for several generations, it may be advantageous to handle the packets by the same network processors 100 and having similar limitations of execution. In such a case, flow-identifications may be given from a range of values. When searching a FICAM 125 implemented using a MCAM, such a range can be specified, and if a flow-identification falls within such a range, a signal will be generated to indicate a 'hit'.

For example, a process flow may generate four child process flows. The father process flow may receive a flow-identification of '8' and the child process flows receiving flow-identification of '9' through '12'. It would now be easy to define a range from '8' to '12' in which all process flows having a flow-identification within that range will be detected. Using an MCAM to implement the functions of FICAM provides for additional flexibility in handling packets as they flow through a network processor, such as network processor 100. In the case where a father and child process receive the same flow-identification, then the packets treaded for the father process and the child process are treated as belonging to the same flow.

Figure 2:
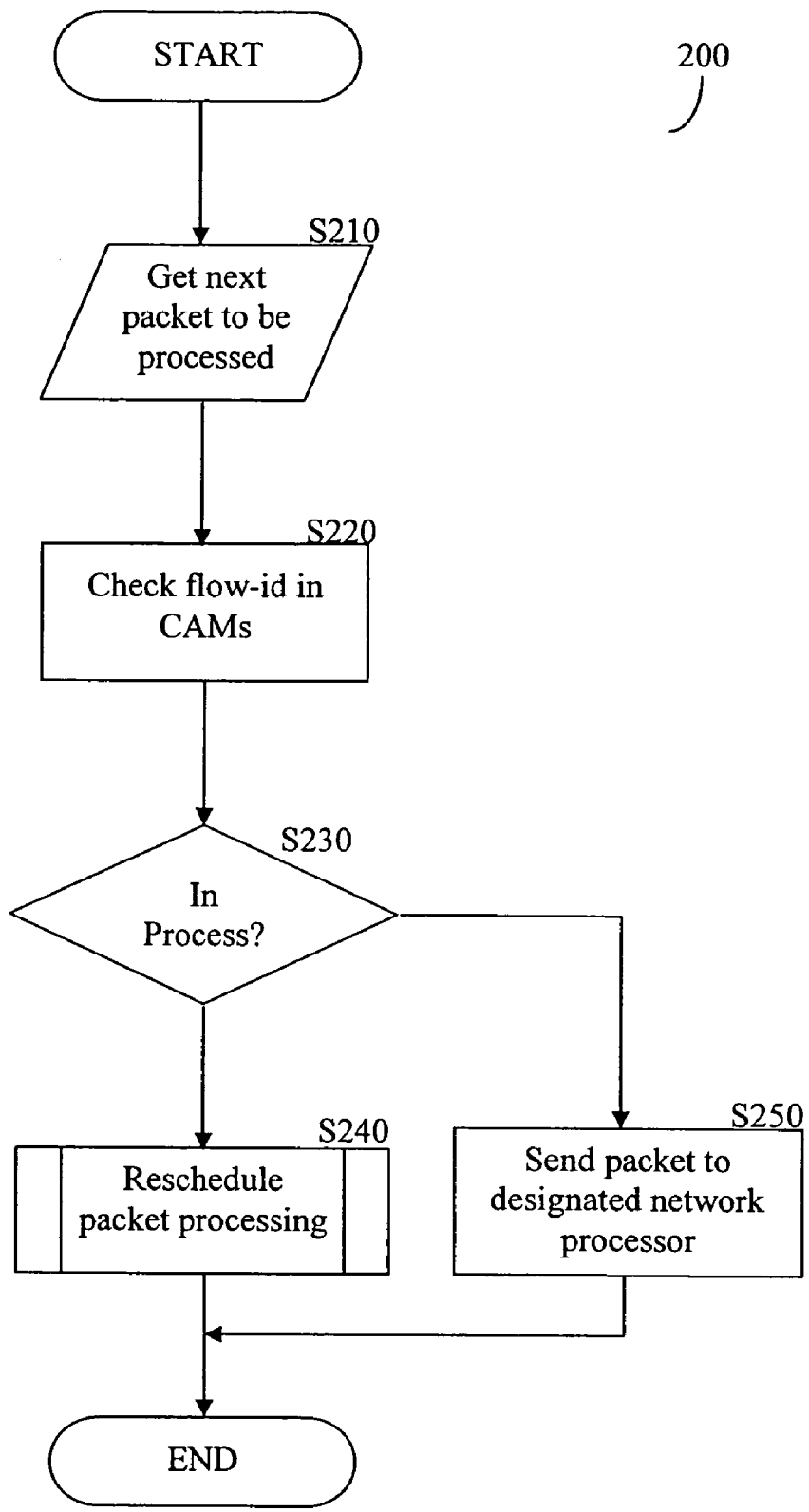
FIG. 2—is an exemplary flowchart showing the operation of packet processing scheduling.

Reference is now made to FIG. 2 where an exemplary and non-limiting flowchart 200 describing the steps to check the existence of a flow-identification in a network processor modified in accordance with the disclosed teachings, is shown. In step S210, the next packet scheduled to be processed by a network processor is selected. In step S220 the packet's flow-identification is checked against a plurality of FICAMs of the network processor. In step S230 it is checked whether a 'hit' was found in any of the FICAMs, i.e., whether a packet belonging to the same process flow is currently being processed in the network processor. If a 'hit' is returned, then processing continues with step S240; otherwise, execution continues with step S250. In step S240 the packet is rescheduled in the queue and when it is time to check again the packet will be checked again in accordance with the disclosed steps in flowchart 200.

In one implementation, the packet will remain at a state of next to be processed until such time that there is a 'miss' indication by all FICAMs of the network processor. In an alternate implementation, the packet is rescheduled to a location in the queue such that it is most likely to be cleared for execution when it reaches the checkpoint again. However, it is essential that such a relocation will not cause the packet to be moved to a position ahead of a an earlier packet in the same process flow, i.e., a later packet, as it is essential to maintain order in packet execution and dispatch. In step S250, as no 'hit' was found the packet is sent for processing in one of the plurality of pipeline units available in the network processor. In addition the FICAM associated with the designated pipeline is updated with the flow-identification of the packet as explained in more detail above.

While only some implementations of a network processor was discussed herein, it should be understood by those skilled in the art that the use of a FICAM is not limited to the specific architecture shown. In fact, FICAM may be used in various implementations of network processors without departing from the scope of the disclosed teachings and the claimed invention.

What is claimed is:

1. A network processor for maintaining processing order of data packets in a process flow, the network processor comprising:
 a packet input queue, each packet in said queue having a unique flow-identification;
 a plurality of pipeline units having respective inputs and outputs disposed within the network processor, each pipeline unit (PU) capable of accepting a received packet from the packet input queue and comprising a predetermined number of pipeline stages for processing the received packet by the network processor, wherein the number of pipeline stages is at least two;
 multiple flow-identification content addressable memories (FICAM), each said FICAM associated with a respective PU and comprising a number of locations, equal to the number of pipeline stages in said respective PU, for accepting respective flow-identifications of packets being processed by the pipeline stages of said respective PU; each said FICAM including:
  a row of content addressable memory (CAM) cells operative to store a first flow-identification, the first flow-identification corresponding to a first packet dispatched for processing by a PU; and
  a comparison unit operative:
   to compare a second flow-identification corresponding to a second packet with contents of said row of CAM cells;
   to make a determination if the second flow-identification is same as the first flow-identification;
   to generate a hit message if said second flow-identification is the same as the first flow-identification; and
   to generate a miss message when none of said multiple FICAM comparison units generate a hit message; and
 a controller, responsive to said hit message, operative to reschedule said second packet such that said second packet is not placed in a PU until said miss message is generated, to maintain processing order of said first and said second packets.

2. The network processor of claim 1, wherein at least one of said pipeline units is capable of transferring the received packet upon completion of processing by the at least one PU to a second PU of said network processor along with the received packet'flow-identification.

3. The network processor of claim 1, wherein said comparison unit is capable of comparing a range of flow-identification values.

4. The network processor of claim 1, wherein upon generating said hit message said FICAM further provides information on a stage of said PU to which said hit message corresponds.

5. The network processor of claim 4, wherein said stage indication is used to reschedule the processing of the second packet.

6. The network processor of claim 1, wherein said FICAM is integrated into an integrated circuit (IC).

7. The network processor of claim 1, wherein at least one of said pipeline units is capable of processing at least one of: layer seven pay-per-click, layer three and layer four counting, layer five metering.

8. The network processor of claim 1, said controller being capable of dispatching a packet upon receiving a miss indication from all of said flow-identification content addressable memories and rescheduling said packet upon receiving a hit indication from at least one of said flow-identification content addressable memories.

9. The network processor of claim 8, wherein said rescheduling comprises comparing the flow-identification of the received packet and the contents of said FICAM in a later cycle.

10. The network processor of claim 1, wherein said FICAM is configured to remove said flow-identification of said packet from said FICAM upon completion of processing of the packet by said respective PU.

11. The network processor of claim 4, wherein each time the processing of the received packet moves to a next pipeline stage, the flow-identification of the packet moves to a next location in said FICAM.

12. A method for maintaining processing order of data packets in a process flow, the method comprising:
receiving packets in a packet input queue, each packet in said queue having a unique flow-identification and a packet order;
providing a network processor having a plurality of pipeline units therein, each pipeline unit (PU) having an input and an output disposed within the network processor, and being capable of accepting a newly-received packet from the packet input queue and comprising a predetermined number of pipeline stages for processing the newly-received packet by the network processor, wherein the number of pipeline stages is at least two;
associating flow-identification content addressable memories (FICAM) with the pipeline units, such that each said FICAM is associated with a respective PU and comprises a number of locations equal to the number of pipeline stages in said respective PU, for accepting respective flow-identifications of packets being processed by the pipeline stages of said respective PU; and
dispatching said newly-received packet for processing in the network processor by one or more of said pipeline units responsively to a comparison between the flow-identification of the received packet and contents of said FICAM,
said dispatching said newly-received packet including:
storing a previously-received flow-identification in one of the locations in said FICAM, the previously-received flow-identification corresponding to a previously-received packet dispatched for processing by a pipeline unit (PU); and
comparing a newly-received flow-identification corresponding to said newly-received packet with said contents of said FICAM;
determining whether said newly-received flow-identification is same as said previously-received flow-identification;
generating a hit message upon said determining that said newly-received flow-identification is the same as said previously-received flow-identification; and
generating a miss message if no comparison of any FICAM generates a hit message; and
upon generating a hit message, rescheduling said newly-received packet such that said newly-received packet is not placed in a PU until said miss message is generated, to maintain processing order of said newly-received and said previously-received packets.

13. The method of claim 12, and comprising transferring the newly-received packet upon completion of processing by at least one of said pipeline units to a second PU with the newly-received packet's flow-identification.

14. The method of claim 12, wherein generating said hit message comprises providing information on a stage of said PU to which said hit message corresponds.

15. The method of claim 14, wherein dispatching said newly-received packet comprises rescheduling the processing of the newly-received packet responsively to said stage indication.

16. The method of claim 14, wherein each time the processing of the newly-received packet moves to a next pipeline stage, the flow-identification of the newly-received packet moves to a next location in said FICAM.

17. The method of claim 12, wherein comparing said newly-received flow-identification comprises comparing a range of flow-identification values.

18. The method of claim 12, wherein dispatching said newly-received packet comprises processing said newly-received packet in at least one of said pipeline units so as to perform at least one of: layer seven pay-per-click, layer three and layer four counting, layer five metering.

19. The method of claim 12, wherein rescheduling said newly-received packet comprises comparing the flow-identification of the newly-received packet and the contents of said FICAM in a later cycle.

20. The method of claim 12, further comprising removing a flow-identification of a packet from a FICAM upon completion of processing of the packet by a PU.

* * * * *

UNITED STATES PATENT AND TRADEMARK OFFICE
CERTIFICATE OF CORRECTION

PATENT NO.        : 7,599,361 B2
APPLICATION NO.   : 10/882305
DATED             : October 6, 2009
INVENTOR(S)       : Oren Malerevich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1111 days.

Signed and Sealed this

Twenty-eighth Day of September, 2010

David J. Kappos
*Director of the United States Patent and Trademark Office*